3,647,815
TRIPHENYLMETHYL IMIDAZOLES
Balthasar Hegedus, Bottmingen, Switzerland, assignor to Hoffmann-La Roche Inc., Nutley, N.J.
No Drawing. Filed Feb. 27, 1970, Ser. No. 15,259
Claims priority, application Switzerland, Mar. 12, 1969, 3,700/69
Int. Cl. C07d 49/36
U.S. Cl. 260—309          5 Claims

ABSTRACT OF THE DISCLOSURE

Compounds represented by the formula

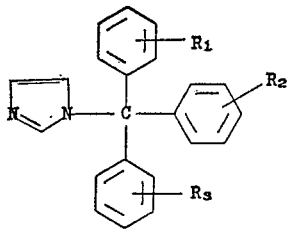

in which $R_1$ is hydrogen, lower alkyl or halogen,
$R_2$ is phenyl and $R_3$ is hydrogen or phenyl, useful as antiprotozoal agents, along with methods of their preparation from the appropriate triphenylmethane and imidazole precursors as well as novel intermediates, are disclosed.

SUMMARY OF THE INVENTION

This invention relates to novel compounds displaying pharmaceutical utility and process for their preparation. More particularly, this invention relates to novel compounds represented by the formula

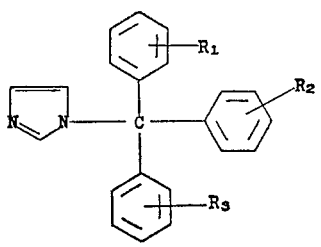

(I)

in which $R_1$ is hydrogen, lower alkyl or halogen,
$R_2$ is phenyl, and $R_3$ is hydrogen or phenyl, as well as processes for their preparation.

As used in Formula I and throughout the specification, lower alkyl includes straight chain or branched chain alkyl groups containing up to six carbon atoms, e.g., methyl, ethyl, propyl, isopropyl, butyl, isobutyl, tertiary butyl and the like. Methyl is the preferred substituent. Halogen includes fluorine, chlorine, bromine and iodine, with chlorine the preferred halogen.

DETAILED DESCRIPTION OF THE INVENTION

Compounds represented by Formula I possess valuable pharmaceutical properties, for example, they are useful in treating protozoal infections, e.g., those caused by Trypanosoma cruzi, the causative agent of Chagas disease.

Tests in warm blooded mammals indicate the compounds of this invention are very effective when orally administered and have very low toxicity. Thus, for example, tests in mice to determine the $ED_{50}$, i.e., the dose which keeps 50% of the animals alive up to termination of the trial, indicate that compounds within the scope of Formula I have an $ED_{50}$ of about 25 to 300 mg./kg. p.o.

Toxicity tests with mice indicate that the $LD_{50}$ of compounds within the scope of Formula I is greater than 5000 mg./kg. p.o.

Thus, for examples, 1 - [di-biphenylyl-(4)-phenylmethyl]imidazole in the mouse has an $ED_{50}$ of 25–30 mg./kg. p.o. and $LD_{50}$ of over 5000 mg./kg. p.o.; 1-[biphenylyl - (4) - diphenyl-methyl]imidazole in the mouse has an $ED_{50}$ of about 60 mg./kg. p.o. and an $LD_{50}$ of over 5000 mg./kg. p.o.; 1 - [di-biphenylyl-(4)-p-tolylmethyl]-imidazole in the mouse has an $ED_{50}$ of about 300 mg./kg. p.o. and an $LD_{50}$ of over 5000 mg./kg. p.o.; 1 - [di-biphenylyl-(4)-p-chlorophenyl-methyl]-imidazole in the mouse has an $ED_{50}$ of 300 mg./kg. p.o. and an $LD_{50}$ of over 5000 mg./kg. p.o.

The $ED_{50}$ values were obtained as follows: The mice were infected intraperitoneally with ca. 80,000 trypanosome forms of Trypanosoma cruzi. The test compound was administered to a group of 6 animals from the 4th to 8th or 5th to 9th day after infection at the highest tolerable dosage divided into 5 equal individual doses. Six infected animals which served as an untreated control group per trial died between the 8th and 15th day after infection. The day of death of each animal was registered, and the experiment was terminated on the 20th day after infection. The trypanosome count in the peripheral blood of the animals was determined microscopically on the 4th or 5th, the 10th or 11th, and the 20th day after infection. The evaluation of the trial was effected by registration of the day of death of each animal. At termination of the trial on the 20th day, animals still living were regarded as surviving. The $ED_{50}$ was then determined by the dose which keeps 50% of the animals alive up to the termination of the trial.

The compounds of this invention can be used as medicaments in the form of conventional pharmaceutical preparations, for example, they can be used in admixture with a pharmaceutical organic or inorganic inert carrier which is suitable for enteral or parenteral application, e.g., water, gelatin, gum arabic, lactose, starches, magdragées, suppositories or capsules, or in liquid form, e.g., as solutions, suspensions or emulsions. The preparations can be administered in solid form, e.g., as tablets, dragees, suppositories or capsules, or in liquid form, e.g., as solutions, suspensions or emulsions. The preparations may be sterilized and/or contain additives such as preserving, stabilizing, wetting or emulsifying agents, salts for varying the osmotic pressure or buffers. They can also contain other therapeutically valuable substances.

Capsules and tablets preferably contain about 50 mg. to about 250 mg. of the active ingredient. The dosage which is utilized is adjusted to the particular needs of the patient being treated. However, under the usual circumstances, about 10 to 30 mg. of active ingredient per kg. of body weight administered orally one or more times per day is utilized.

The compounds of Formula I which are particularly advantageous as antiprotozoal agents because of their activity against *Trypanosoma cruzi* infections are those represented by the formula

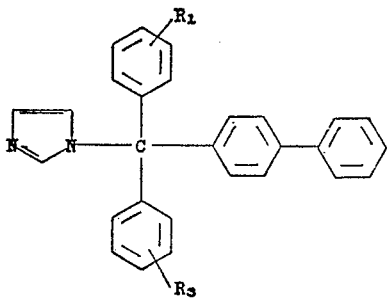

(Ia)

in which $R_1$ is hydrogen, methyl or chlorine and $R^3$ is hydrogen or phenyl.

Representative compounds within the scope of this preferred embodiment of the invention are:

1-[biphenylyl-(4)-diphenyl-methyl]-imidazole
1-[di-biphenylyl-(4)-phenyl-methyl]-imidazole
1-[di-biphenylyl-(4)-p-tolyl-methyl]-imidazole
1-[di-biphenylyl-(4)-p-chlorophenyl-methyl]-imidazole.

Of these, 1-[di-biphenylyl-(4)-phenyl-methyl]imidazole is the most preferred.

The compounds represented by Formula I are prepared by reacting an imidazole represented by the formula

(II)

in which R signifies hydrogen, an equivalent of a metal atom or a trialkylsylyl group, preferably a tri-(lower alkyl)-sylyl group with a compound furnishing a trityl group represented by the formula

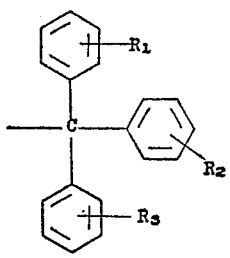

(III)

in which $R_1$ is hydrogen, lower alkyl or halogen, $R_2$ is phenyl and $R_3$ is hydrogen or phenyl.

Suitable metal atoms represented by R in Formula II are those of Groups I, II and III of the Periodic Table of Elements. The preferred metals are those of Groups I and II and the most preferred metals are those of Group I, e.g., sodium and silver.

Compounds which furnish the trityl group of Formula III can be represented by the formula

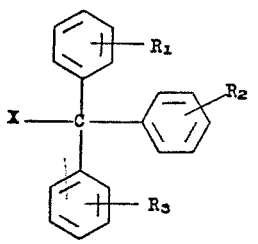

(IIIa)

in which $R^1$ is hydrogen, lower alkyl or halogen, $R_2$ is phenyl, $R_3$ is hydrogen or phenyl and X is mesyloxy, tosyloxy or halogen. The preferred halogens are chlorine or bromine.

The compounds represented by Formula II are known compounds. Their preparation is conventional, for example, imidazole-silver can be obtained by the reaction of imidazole with silver nitrate in an alkaline medium.

The compounds represented by Formula IIIa can be produced by means of a Grignard reaction in which an unsubstituted or correspondingly substituted phenyl magnesium bromide is reacted with a correspondingly substituted benzophenone and the resulting carbinol is subsequently halogenated, mesylated or tosylated. Among the compounds represented by Formula IIIa are known compounds as well as novel compounds. The novel compounds are those in which $R_1$ is halogen or lower alkyl, e.g., di-[biphenylyl-(4)]-p-tolyl-chloromethane and di-[biphenylyl-(4)]-p-chlorophenyl-chloromethane.

The reaction of a compound represented by Formula II with a compound represented by Formula IIIa is advantageously effected in an organic solvent. Suitable organic solvents are aprotic organic solvents such as dimethylformamide, dimethyl sulfoxide and the like, aromatic hydrocarbons such as benzene, toluene, xylene and the like and heterocyclic ethers such as tetrahydrofuran, dioxane and the like.

The reaction is advantageously effected at a temperature between about room temperature, i.e., about 20° C., and about 90° C., preferably between about 30° C. and about 60° C.

When a compound represented by Formula II in which R is hydrogen is utilized, the reaction is advantageously carried out in the presence of an acid binding agent. Suitable acid binding agents are alkali metal alcoholates such as sodium methylate and the like, secondary organic amines such as piperidine, morpholine and the like, or tertiary organic amines such as pyridine, trialkylamines and the like.

The following examples illustrate the invention, all temperatures are in degrees centigrade.

EXAMPLE 1

36 g. of diphenyl-biphenylyl-(4)-chloromethane are introduced portionwise into a well-stirred mixture of 6.5 g. of imidazole, 5.1 g. of sodium methylate and 150 ml. of dimethylformamide. The reaction mixture is heated for about 5–10 minutes on a steam-bath until it becomes neutral. It is then diluted with 400–500 ml. of chloroform and washed 4–5 times with water to remove the dimethylformamide. After drying with sodium sulfate, the chloroform is removed under vacuum. The resulting residue is then dissolved in about 200 ml. of benzene and chromatographed on silica gel. The by-products are removed with benzene and the reaction product is then eluted with benzeneethyl acetate (1:1). The eluate is evaporated in vacuum and the resulting yellowish oil is triturated with ether, causing it to crystallize. The product is then recrystallized from acetonitrile. The 1-[biphenyl-(4)-diphenyl-methyl]-imidazole is thus obtained in the form of white crystals of M.P. 167–168° which dissolve in concentrated sulfuric acid and form deep violet-blue colored solution.

EXAMPLE 2

34.2 g. of di-[biphenylyl-(4)]-phenyl-chloromethane are introduced with stirring into a mixture of 5.35 g. of imidazole, 4.2 g. of sodium methylate and 120 ml. of dimethylformamide. The resulting mixture is then heated on a steam-bath until it becomes neutral. It is then diluted with 400–500 ml. of chloroform and washed 4–5 times with water to remove the dimethylformamide. After drying with sodium sulfate, the chloroform is removed under vacuum. The resulting residue is then dissolved in about 200 ml. of benzene and chromatographed on silica gel. The by-products are removed with benzene and the reaction product is then eluted with benzene-ethyl acetate (1:1). The eluate is evaporated in vacuum and the resulting yellowish oil is triturated with ether, causing it to crystallize. The product is then recrystallized from di-n-butyl ether. The 1-[di-biphenylyl-(4)-phenyl-methyl]-imidazole is thus obtained in the form of white crystals of M.P. 169–170° which dissolve in concentrated sulfuric acid and form a deep violet-blue colored solution.

EXAMPLE 3

17.5 g. of imidazole-silver are stirred into 200 ml. of dimethylformamide then 43 g. of di-[biphenylyl-(4)]-phenylchloromethane are introduced portionwise. The resulting mixture is stirred overnight at room temperature and the silver chloride is filtered off. The resulting product, 1-[di-biphenylyl-(4)-phenyl-methyl]-imidazole of M.P. 169–170°, is worked up and recovered in accordance with the procedures of Examples 1 and 2.

EXAMPLE 4

A mixture of 6.1 g. of imidazole, 12.5 ml. of triethylamine and 150 ml. of benzene are stirred at 60°, forming a solution. 39 g. of di-[biphenylyl-(4)]-phenyl-chloromethane are introduced portionwise to the solution which is then stirred for 1 to 1½ hours at 60°. The resulting triethylamine hydrochloride is then separated by filtration while warm. The filtrate is then diluted with 300 ml. more of benzene, washed 2–3 times with water and dried with sodium sulfate. The benzene solution is then chromatographed on silica gel. The product, 1-[di-biphenylyl-(4)-phenyl-methyl]-imidazole of M.P. 169–170°, is worked up and recovered in accordance with the procedure of Example 2.

EXAMPLE 5

A mixture of 14 g. of N-trimethylsylyl-imidazole and 43 g. of di-[biphenylyl-(4)]-phenyl-chloromethane are heated at reflux in 200 ml. of benzene for 2 hours. The resulting mixture is then evaporated in vacuum, benzene is added and the evaporation is repeated once more. Additional benzene is added and the product is worked up and recovered in accordance with the procedure of Example 2. The product is identical to that of Example 2.

EXAMPLE 6

(a) p-Tolyl magnesium bromide is reacted in refluxing tetrahydrofuran with 4,4'-diphenyl-benzophenone. After hydrolysis of the reaction product with diluted HCl one obtains di-[biphenylyl-(4)]-p-tolyl-carbinol of M.P. 143–145°. The carbinol is then chlorinated with acetyl chloride in benzene to form di-[biphenylyl-(4)]-p-tolyl-chloromethane of M.P. 145–146°.

(b) 3.6 g. of imidazole and 7.4 ml. of triethylamine are dissolved in 350 ml. of benzene at 60° and 23.3 g. of di-[biphenylyl-(4)]-p-tolyl-chloromethane is introduced portionwise. After 1 hour stirring at 60°, the reaction mixture becomes neutral. The benzene solution is washed out 2–3 times with water, dried with sodium sulfate and evaporated in vacuum. The residual oil crystallizes on triturating with ether. It is then recrystallized from acetonitrile. The resulting product, 1-[di-biphenylyl-(4)-p-tolyl-methyl]-imidazole, forms white crystals and melts at 172–174°.

EXAMPLE 7

(a) 4-chlorophenyl magnesium bromide is reacted in refluxing tetrahydrofuran with 4,4'-diphenyl-benzophenone. After hydrolysis of the reaction product with diluted HCl one obtains di[biphenylyl-(4)]-p-chlorophenyl-carbinol of M.P. 84–86°. The carbinol is then chlorinated with acetyl chloride in benzene to form di-[biphenylyl-(4)]-p-chlorophenyl-chloromethane of M.P. 79–80°.

(b) Following the procedure of Example 6 but using 24.4 g. of di-[biphenylyl-(4)]-p-chlorophenyl-chloromethane instead of di-[biphenylyl-(4)]-p-tolyl-chloromethane, results in the production of 1-[di-biphenylyl-(4)-p-chlorophenyl-methyl]-imidazole of M.P. 149–150°.

EXAMPLE 8

Tablets of the following composition are manufactured in conventional manner:

|  | Mg. |
|---|---|
| 1-[di-biphenylyl-(4)-phenyl-methyl]-imidazole | 50.0 |
| Corn starch | 20.0 |
| Lactose (spray-dried) | 40.0 |
| Avicel (microcrystalline cellulose) | 85.0 |
| Talcum | 4.5 |
| Magnesium stearate | 0.5 |
| Total weight | 200.0 |

EXAMPLE 9

Capsules of the following compositions are manufactured in conventional manner:

|  | Mg. |
|---|---|
| 1-[di-biphenylyl-(4)-phenyl-methyl]imidazole | 50 |
| Lactose | 150 |
| Talcum | 9 |
| Magnesium stearate | 1 |
| Total weight | 210 |

I claim:
1. A compound represented by the formula

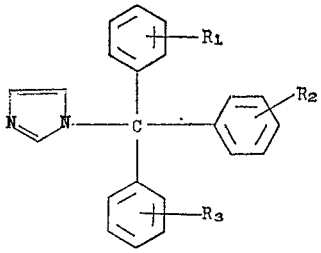

in which $R_1$ is hydrogen, lower alkyl or halogen, $R_2$ is phenyl and $R_3$ is hydrogen or phenyl.

2. 1-[biphenyl-(4)-diphenyl-methyl]-imidazole.
3. 1-[di-biphenylyl-(4)-phenyl-methyl]-imidazole.
4. 1-[di-biphenylyl-(4)-p-tolyl-methyl]-imidazole.
5. 1-di-biphenylyl(4)-p-chlorophenyl-methyl]imidazole.

References Cited

UNITED STATES PATENTS

| 2,994,692 | 8/1961 | Amiard et al. | 260—389 |
| 3,321,366 | 5/1967 | Mussell et al. | 260—309 |
| 3,519,638 | 7/1970 | Kawakami et al. | 260—309 |
| 3,255,201 | 6/1966 | Beaman et al. | 260—309 |

FOREIGN PATENTS

| 1,136,342 | 9/1962 | Germany | 260—309 |

OTHER REFERENCES

Fournari et al.: Bul. Soc. Chim. France 1968, pages 2438–46.

Giesemann et al.: Chem. Ber., vol. 93, pages 570–6 (1960).

Geisemann et al.: Chem. Abst., vol. 54, columns 15368–9 (1960).

Chemical Abstracts: vol. 71, No. 91,473m (1969).

Chemical Abstracts: vol. 71, No. 101,858g (1969).

Bazant et al.: Organo Silicon Compounds, pages 85–8, New York, Academic Press, 1965.

Birkofer et al.: Chem. Abst., vol. 55, column 14437 (1961).

NATALIE TROUSOF, Primary Examiner

U.S. Cl. X.R.

260—389; 424—273